United States Patent
Prokudin

(10) Patent No.: US 9,654,486 B2
(45) Date of Patent: May 16, 2017

(54) SYSTEM AND METHOD FOR GENERATING SETS OF ANTIVIRUS RECORDS FOR DETECTION OF MALWARE ON USER DEVICES

(71) Applicant: AO Kaspersky Lab, Moscow (RU)

(72) Inventor: Sergey V. Prokudin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/044,435

(22) Filed: Feb. 16, 2016

(65) Prior Publication Data

US 2017/0093892 A1    Mar. 30, 2017

(30) Foreign Application Priority Data

Sep. 30, 2015 (RU) .................................. 2015141552

(51) Int. Cl.
  *G06F 17/00* (2006.01)
  *H04L 29/06* (2006.01)
  *G06F 21/56* (2013.01)

(52) U.S. Cl.
  CPC .......... *H04L 63/1416* (2013.01); *G06F 21/56* (2013.01); *H04L 63/14* (2013.01); *H04L 63/20* (2013.01); *G06F 21/561* (2013.01); *G06F 21/564* (2013.01)

(58) Field of Classification Search
  CPC ...... G06F 21/56; G06F 21/561; G06F 21/562; G06F 21/564; H04L 63/14–63/1433; H04L 29/06877–29/06904
  See application file for complete search history.

(56) References Cited

U.S. PATENT DOCUMENTS

| | | | |
|---|---|---|---|
| 8,239,944 B1 * | 8/2012 | Nachenberg | H04L 63/1416 713/150 |
| 8,239,948 B1 * | 8/2012 | Griffin | H04L 63/1416 726/22 |
| 8,566,943 B2 | 10/2013 | Martynenko et al. | |
| 8,776,234 B2 | 7/2014 | Doukhvalov | |
| 8,875,292 B1 * | 10/2014 | Bogorad | G06F 21/564 726/24 |

(Continued)

FOREIGN PATENT DOCUMENTS

| | | |
|---|---|---|
| EP | 0 472 270 A1 | 2/1992 |
| EP | 0 809 071 A1 | 11/1997 |

(Continued)

OTHER PUBLICATIONS

European Search Report and Written Opinion for EP 16 15 8363, dated Feb. 23, 2017.

*Primary Examiner* — Daniel Potratz

(74) *Attorney, Agent, or Firm* — Arent Fox LLP; Michael Fainberg

(57) ABSTRACT

Disclosed are systems and method for generating a set of antivirus records to be used for detection of malicious files on a user's devices. An exemplary method includes maintaining, by a server, a database of malicious files; generating, by the server, at least one antivirus record for each malicious file; calculating an effectiveness of each antivirus record by determining how many different malicious files were detected using each antivirus record; generating a set of most effective antivirus records; and transmitting, by the server, the set of most effective antivirus records to a client device.

21 Claims, 3 Drawing Sheets

(56) References Cited

U.S. PATENT DOCUMENTS

| | | | |
|---|---|---|---|
| 8,955,120 B2 | 2/2015 | Antonov et al. | |
| 9,147,073 B2 | 9/2015 | Zaitsev | |
| 9,251,261 B2* | 2/2016 | Uscilowski | G06F 21/564 |
| 2014/0143869 A1* | 5/2014 | Pereira | G06F 21/566 |
| | | | 726/23 |

FOREIGN PATENT DOCUMENTS

| | | |
|---|---|---|
| EP | 2854065 A1 | 4/2015 |
| WO | 2015/084313 A1 | 6/2015 |

* cited by examiner

SYSTEM AND METHOD FOR GENERATING SETS OF ANTIVIRUS RECORDS FOR DETECTION OF MALWARE ON USER DEVICES

CROSS-REFERENCE TO RELATED APPLICATIONS

The present disclosure claims benefit of priority under 35 U.S.C. 119(a)-(d) to a Russian Application No. 2015141552 filed on Sep. 30, 2015, which is incorporated by reference herein.

FIELD OF TECHNOLOGY

The present invention relates generally to the field of computer security and, more specifically to systems and methods of generating a set of antivirus records to be used for detection of malicious files on a user's computing devices.

BACKGROUND

The number of different software applications for user's computing devices, such as personal computers, laptops, tablet, smart phones, etc, increases with tremendous pace. Among the multitude of applications there is a group of malicious programs which are able to cause harm to the user device or the data of the user, such as: Internet worms, key loggers and computer viruses. There have been developed many different technologies for providing computer security, such as antivirus software, which is designed to detect malicious programs on the user device and to block their operating ability (e.g., placing them in quarantine or removing them from the user device).

The antivirus software may use a number of different methods of detecting malicious software, malicious processes, other malicious objects of the operating system (OS) and links to them, such as the URI (Universal Resource Identifier, such as file://***.exe). The most popular malware detection methods are signature analysis (a technology for finding correspondences between a particular segment of code of the program being analyzed and a known code, or signature, in a database of signatures of malicious programs), heuristic analysis (a technology involving emulating the working of a program being analyzed, creating an API (Application Programming Interface) function call log, and finding correspondences between the data of the created API function call log and the data in a database of emulations of malicious programs), and proactive analysis (a technology involving intercepting API function calls launched in the system of the program being analyzed, creating an API function call log, and finding correspondences between the data of the created log and the data in a database of calls for API functions of malicious programs).

In operation, each of the aforementioned methods requires data to be used for the detection of malicious objects, for example, in the case of signature analysis, such data might be signatures, for heuristic analysis, such the data might be heuristic rules. Despite the fact that, for example, when a single signature is used, the antivirus software may detect a whole array of malicious objects similar in their structure or in the harm caused. Therefore, the ever increasing number of malicious objects which can cause harm to the user's data or to his computer requires a corresponding increase in the volume of data used for detecting malicious objects. In the majority of cases, said data is stored on the user's computer as part of antivirus libraries—a component of the antivirus software. Thus, increasing the volume of data used for the detection, may result in the decrease of available space on the hard drive of the user device.

Although there are known approaches aimed at optimizing (reducing) the space on a hard drive occupied by data used for the detection of malicious objects, they are not able to solve the problem of selection of the data to be used for the detection of malicious objects, namely, the generating of such a set of data to be used for the detection of malicious objects which does not require a large memory volume for storage, yet which affords a reliable protection of the user device, or they do not solve this problem effectively enough. Therefore, there is a need for a more effective solution of the problem of selection of the data to be used for detection of malicious objects.

SUMMARY

Disclosed are systems and method for generating a set of antivirus records to be used for detection of malicious files on a user's computing devices. An exemplary method includes maintaining, by a server, a database of malicious files; generating, by the server, at least one antivirus record for each malicious file; calculating, by the server, an effectiveness of each antivirus record by determining how many different malicious files were detected using each antivirus record; generating, by the server, a set of most effective antivirus records, comprising: selecting for each known malicious file the most effective antivirus record used in detection of said malicious file, wherein an antivirus record used to detect more malicious files is more effective than an antivirus record used to detect fewer malicious files; determining whether the selected antivirus record is already in the set; and if the selected antivirus record is not in the set, adding said record to the set; and transmitting, by the server, the set of most effective antivirus records to a client device.

In one exemplary aspect, the antivirus record includes one or more of: a signature of a malicious file; a heuristic rule used for detection of a malicious file during emulation of the malicious file; a heuristic rule used for detection of a malicious file during proactive detection; and a locality sensitive hash of a malicious file.

In one exemplary aspect, calculating an effectiveness of each antivirus record by determining how many malicious files were detected using each antivirus record, includes collecting, by an antivirus application running on the server, statistics on a number of malicious files detected by the antivirus application using each antivirus record.

In one exemplary aspect, the effectiveness of an antivirus record is calculated as a function of a number of different malicious files detected using said antivirus record.

In one exemplary aspect, the effectiveness of an antivirus record is calculated as a function of a number of different malicious files detected by said antivirus record and a number of false positive detections by said antivirus record.

In one exemplary aspect, the effectiveness of an antivirus record is calculated as a function of a number of different malicious files detected by said antivirus record and a category to which each of the detected malicious files belongs, the category including one of the trusted, untrusted and malicious.

In one exemplary aspect, the effectiveness of an antivirus record is further calculated as a function of a popularity of each detected malicious file on client devices.

An exemplary system for generating sets of antivirus records comprises: a server having a hardware processor configured to: maintain a database of malicious files; generate at least one antivirus record for each malicious file; calculate effectiveness of each antivirus record by determining how many different malicious files were detected using each antivirus record; generate a set of most effective antivirus records, comprising: select for each known malicious file the most effective antivirus record used in detection of said malicious file, wherein an antivirus record used to detect more malicious files is more effective than an antivirus record used to detect fewer malicious files; determine whether the selected antivirus record is already in the set; and if the selected antivirus record is not in the set, add said record to the set; transmit the set of most effective antivirus records to a client device.

An exemplary non-transitory computer readable medium storing computer executable instructions for generating sets of antivirus records, includes instructions for: maintaining, by a server, a database of malicious files; generating, by the server, at least one antivirus record for each malicious file; calculating, by the server, an effectiveness of each antivirus record by determining how many different malicious files were detected using each antivirus record; generating, by the server, a set of most effective antivirus records, comprising: selecting for each known malicious file the most effective antivirus record used in detection of said malicious file, wherein an antivirus record used to detect more malicious files is more effective than an antivirus record used to detect fewer malicious files; determining whether the selected antivirus record is already in the set; and if the selected antivirus record is not in the set, adding said record to the set; and transmitting, by the server, the set of most effective antivirus records to a client device.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

DETAILED DESCRIPTION OF EXEMPLARY ASPECTS OF THE INVENTION

Figure 1:
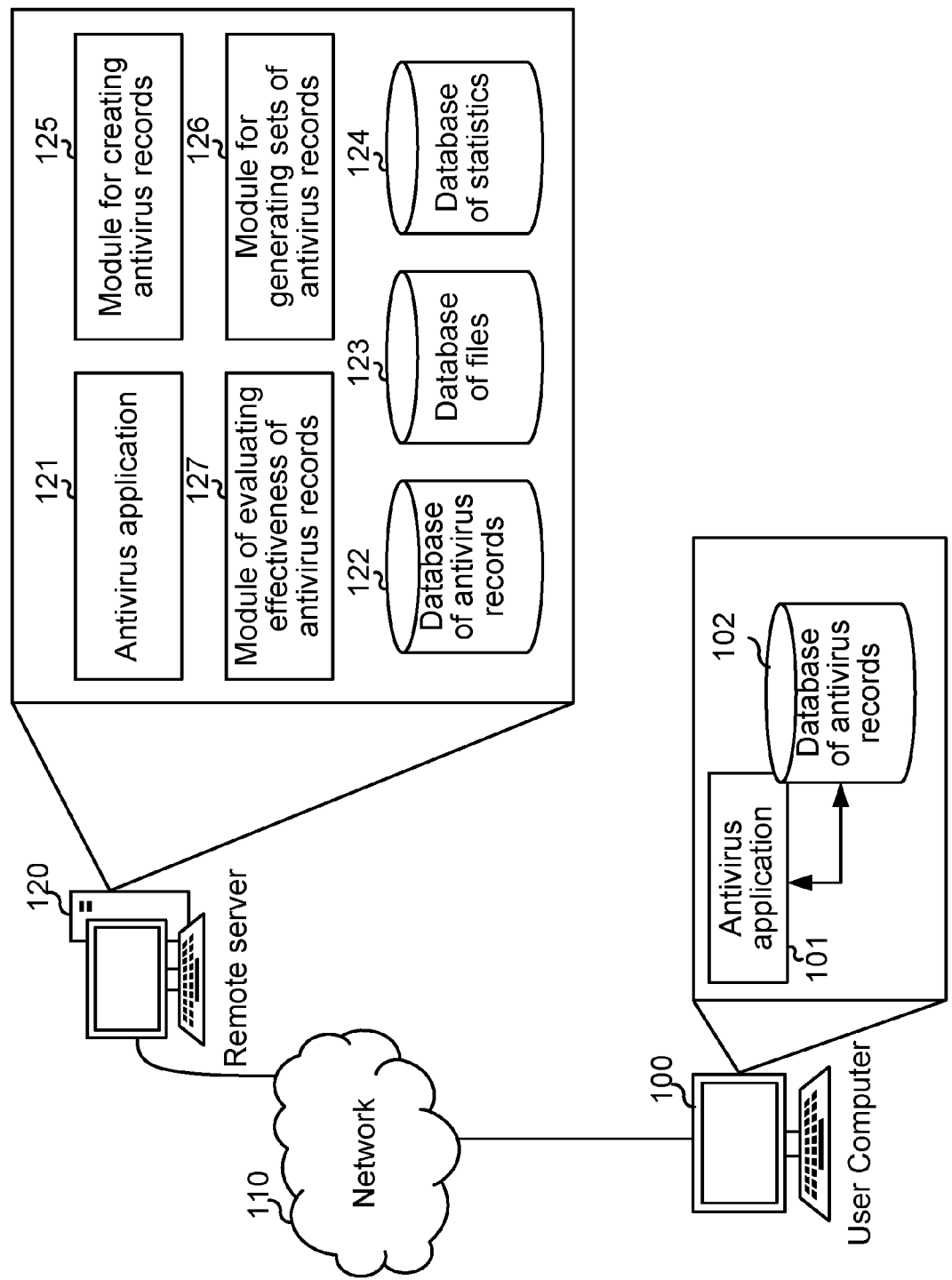
FIG. 1 illustrates a diagram of an exemplary system for generating a set of antivirus records to be used for detection of malicious files on a user device.

Example aspects of the present invention are described herein in the context of a system, method, and computer program product for generating a set of antivirus records to be used for detection of malicious files on a user's computing devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Initially, a number of definitions of terms which will be used in describing various exemplary aspects of the invention will be provided herein below.

A malicious application may include an application able to cause harm to a computer or to the data of the computer user, for example, an Internet worm, a key logger, a computer virus. The harm caused may be unlawful access to computer resources, including the data being stored on the computer, for the purpose of theft, and also unlawful use of resources, including for data storage, performance of calculations, and so on.

A trusted application may include an application which does not cause harm to the computer or its user. A trusted application can be an application developed by a trusted software manufacturer, downloaded from a trusted source (such as a site listed in a database of trusted sites) or an application whose identifier (such as the MD5 of the application file) is stored in a database of trusted applications. The manufacturer's identifier, such as a digital certificate, may also be stored in the database of trusted applications.

An untrusted application may include an application which is not trusted, but also not recognized as being malicious, for example, by means of an antivirus application.

A malicious file may include a component of a malicious application, such as an executable file, a configuration file, and other files used by the application during its execution.

An untrusted file may include a file which is a component of an untrusted application.

A trusted file may include a file which is a component of a trusted application.

Signature analysis may include a technology of finding correspondences between a particular segment of program code and a known code—signature—from a database of signatures of malicious programs with the goal of detecting a malicious program. It should be noted that this technology can be used both to detect files of a malicious program and to detect malicious code in the RAM of a computing device.

Heuristic analysis may include a technology involving emulating the execution of a program (executing program code, adapted for execution with the use of certain hardware and software, by making use of other hardware and software different from the former), creating an API function call log, and finding correspondences between the data of the created API function call log and the data from a database of emulations of malicious programs in order to detect a malicious program.

Proactive analysis may include a technology involving intercepting API function calls launched in the operating system of the program, creating an API function call log, and finding correspondences between the data from the created log and the data from a database of API function calls of malicious programs in order to detect a malicious program.

An antivirus record may include information needed by the antivirus application to detect malicious files. It may be, for example, a signature, a heuristic rule (which can be used, for example, by heuristic and proactive analysis), a check sum or hash of a file (including a flexible or locality-sensitive hash—a file hash which is invariant to minor file changes).

The statistics on the use of an antivirus record may include information on the number of malicious files detected by the antivirus application using the antivirus record, and also an identifier of each file detected with the help of the antivirus record (for example, a check sum calculated according to one of the algorithms: MD5, SHA-1, SHA-2, or a character string—the file name). The collection of statistics may be done by the antivirus application using the antivirus record for detection of malicious files (during the detection of malicious files).

The effectiveness of an antivirus record may be a numerical value; the larger it is, the more malicious files have been detected by the antivirus application using that antivirus record among the files in a files database.

FIG. 1 shows a diagram of an exemplary system for generating a set of antivirus records to be used for detection of malicious files on a user's computer according to one aspect of the invention. On the user's computer 100 there is installed an antivirus application 101, which is configured to detect malicious files on the computer 100. The antivirus application 101 uses the antivirus records stored in a database of antivirus records 102, which likewise may reside on the user's computer 100. The user's computer 100 is connected via a network 110 (in one exemplary aspect, the Internet or a local area network, LAN) to a remote server 120. In one exemplary aspect, the remote server 120 may be a single computing device. In another exemplary aspect the remote server 120 may be a set of connected computing devices performing distributed computations (computations in which the overall volume of computations, such as the execution of code, is broken up into parts and distributed among several computing devices) for performing functions of systems and methods disclosed herein.

In one exemplary aspect, the remote server 120 may include an antivirus application 121, a module of creating antivirus records 125, a module of generating sets of antivirus records 126, a module of evaluation of the effectiveness of antivirus records 127, a database of antivirus records 122, a database of files 123 and a database of statistics 124.

It should be noted that the antivirus application 101 and the antivirus application 121 in one exemplary aspect of the invention may perform similar functions in the detection of malicious objects and collection statistics, which will be described below.

In one exemplary aspect, the database of files 123 is configured to store files, such as malicious files, trusted files and untrusted files, as well as information as to whether a file being stored is malicious, trusted, or untrusted. In one exemplary aspect, files are added to the database of files 123 by an expert in computer security together with information (indication) as to whether the file is malicious, trusted, or untrusted. In yet another exemplary aspect, in addition to the aforementioned files, file identifiers may be stored in the database of files 123 (for example, check sums of files calculated according to one of the algorithms: MD5, SHA-1, SHA-2, or a character string—the file name).

In one exemplary aspect, the antivirus application 121 is configured to detect malicious files. For detection of malicious files, the antivirus application 121 utilizes antivirus records (at least one) from a database of antivirus records 122, the database of antivirus records 122 being configured to store antivirus records. The antivirus records may be used by the antivirus application 121 in the course of performing a signature, heuristic or proactive analysis.

In one exemplary aspect, the antivirus record may contain a flexible hash (locality-sensitive hash). The flexible hash is also known as a "flexible convolution" constitutes a hash sum (hash) which is calculated from a set of file attributes, which is resistant to slight changes in the file (for example, the hash sum calculated from the file will coincide with the hash sum calculated from a file in which one of the attributes, for example, has a different value). In the case that the antivirus record contains a flexible hash of a malicious file, the antivirus application 121 during the analysis of the file in order to detect a malicious file will calculate the flexible hash of the file being analyzed (from the set of file attributes) and compare this with the flexible hash from the antivirus record. If the calculated flexible hash and the flexible hash from the antivirus record match, the file being analyzed is recognized by the antivirus application 121 as being malicious. In one exemplary aspect, the antivirus record may contain, besides a flexible hash, information (such as a character identifier) as to the method of calculating the hash, which needs to be used by the antivirus application 121 during the analysis of the file. It should be noted that the above-described method of detection (using antivirus records containing a flexible hash) of malicious files can also be used by the antivirus application 101 which is residing on the user's computer 100.

In one exemplary aspect, the module for creating antivirus records 125 is configured to create antivirus records and store them in a database of antivirus records 122. For the creation of an antivirus record, the module 125 uses the file (which will need to be detected with the help of the antivirus record) and one of the following methods of creating antivirus records.

In one exemplary aspect, the module for creating antivirus records 125 creates an antivirus record for detection of a malicious file, said record containing a signature (a sequence of bytes of the file) of the indicated file so that the file is recognized as malicious by the antivirus application 121 if it contains the signature from the antivirus record.

In another exemplary aspect, the module for creating antivirus records 125 creates an antivirus record for detection of a malicious file, said record containing a heuristic rule such that said file is recognized as malicious by the antivirus application 121 in accordance with the logic of the heuristic rule, which is applied to the API function call log which is generated during the emulated execution of the program (if the file is executable) during the heuristic analysis of the file. In one exemplary aspect, the technology described in a commonly owned U.S. Pat. No. 9,147,073, which is incorporated by reference herein, may be used to create such an antivirus record.

In yet another exemplary aspect, the module for creating antivirus records 125 creates an antivirus record for detection of a malicious file, said record containing a heuristic rule such that said file is recognized as malicious by the antivirus application 121 in accordance with the logic of the heuristic rule, which is applied to the API function call log which is generated upon interception of API function calls which is launched in the operating system of the program (if the file is executable) during the proactive analysis of the file. An example of this technology is described in a commonly owned U.S. Pat. No. 8,566,943, which is incorporated by reference herein.

In yet another exemplary aspect, the module for creating antivirus records 125 creates an antivirus record for detection of a malicious file, said record containing a flexible hash of the file, such that said file is recognized as malicious by the antivirus application 121 if the calculated flexible hash of the file matches up with the flexible hash from the antivirus record.

In yet another exemplary aspect, the module for creating antivirus records 125 is configured to create several antivirus records for the same malicious file, by means of which records said file can be recognized as malicious by the antivirus application 121 (for example, with the use of several of the aforementioned methods of creating an antivirus record). In one exemplary aspect, the module of creating antivirus records 125 is able to create antivirus records containing different flexible hashes for detection of one and the same file (we shall assume that such antivirus records are created using different methods for creation of antivirus records). Each of these antivirus records is created with the use of its own method of calculation of the hash (for example, one of the methods listed below). In one exemplary aspect, the module of creating antivirus records 125 may use algorithm for calculation of flexible hashes for creating antivirus records as described in a commonly owned U.S. Pat. No. 8,955,120, which is incorporated by reference herein. The sets of file attributes used in calculating the flexible hash may be different:

For example, in order to calculate the flexible hash, the following set of file attributes may be used: the file size, the file image size, the number of file sections, the RVA (Related Virtual Address) of the file sections, the RVA of the entry point, the type of subsystem, the file characteristics from the COFF (Common Object File Format) header, the mutual arrangement of the objects of the table of directories, the disposition of the objects of the table of directories by file sections, the type of compiler used to create the file, the frequency characteristics of the characters (including printed characters)—the frequencies of encountering the characters in the file, the set of lines of the file and their number. A set of file attributes for each file section includes the following attributes: the informational entropy of the beginning and end of a section, the average number of nonzero bytes of the beginning and end of a section, the virtual size of a section, the physical size of a section.

In another example, in order to calculate the flexible hash, the following set of file attributes may be used: the file size, the file image size, the number of file sections, the RVA of the file sections, the RVA of the entry point, the type of subsystem, the file characteristics from the COFF header, the type of compiler used to create the file;

In yet another example, in order to calculate the flexible hash, the following set of file attributes may be used: the file size, the file image size, the type of subsystem, the frequency characteristics of the characters (the frequencies of encountering the characters in the file, the set of lines of the file and their number).

in yet another example, in order to calculate the flexible hash, the following set of file attributes may be used: the file size, the file image size, the number of file sections, file sections, the RVA of the entry point, the type of subsystem, the file characteristics from the COFF header, the mutual arrangement of the objects of the table of directories, the disposition of the objects of the table of directories among the file sections, the type of compiler used to create the file, the frequency characteristics of the characters. The set of file attributes for each file section may include the following attributes: the informational entropy of the beginning and end of a section, the average number of nonzero bytes of the beginning and end of a section, the virtual size of a section, the physical size of a section.

In yet another example, in order to calculate the flexible hash, the following set of file attributes may be used: the file size, the file image size, the type of subsystem, the file characteristics from the COFF header, the type of compiler used to create the file, the frequency characteristics of the characters.

In another example, in order to calculate the flexible hash, various other combinations of the aforementioned attributes may be used.

In yet another exemplary aspect, the module for creating antivirus records 125 allows an expert in computer security to create an antivirus record (e.g., via a user's interface) for one of the aforementioned methods of detection (e.g., signature, heuristic analysis, and others).

In one exemplary aspect, the module for creating antivirus records 125 stores the created antivirus records in the database of antivirus records 122.

In one exemplary aspect, the module for creating antivirus records 125 uses malicious files from the database of files 123 for one or more creating antivirus records using one or more of the aforementioned methods, respectively, with the help of which the antivirus application 121 can recognize as malicious the aforesaid files from the database of files 123.

In one exemplary aspect, the antivirus application 121 is configured to collect statistics on the use of antivirus records to be used for detection of malicious files. The statistics on the use of antivirus records is collected using the database of files 123, as well as the database of antivirus records 122, specifically upon detection of malicious files with the use of the antivirus records from the database of antivirus records 122 among the files of the database of files 123. The antivirus application 121 sends statistics collected on the use of the antivirus records for storage to the database of statistics 124. It should be noted that the antivirus application 121, using an antivirus record, can recognize as malicious not only known malicious files (such as malicious files from the database of files 123), but also trusted files (whose detection is considered a "false alarm" or "false positive") or untrusted files from the database of files 123.

In one exemplary aspect, the database of statistics 124 is configured to save the statistics on the use of antivirus records collected by the antivirus application 121.

In one exemplary aspect, the module of evaluating the effectiveness of antivirus records 127 is configured to determine (calculate) the effectiveness of at least one antivirus record. The module 127 calculates the effectiveness of each antivirus record from the database of antivirus records 122 for which the antivirus application 121 has collected statistics on the use of antivirus record and saved this statistics on the use of antivirus record in the database of statistics 124. In one exemplary aspect, the effectiveness of the antivirus record can be calculated with the use of the following formula:

$$K=U$$

where K is the effectiveness of the antivirus record and U is the number of files (one exemplary aspect, from the database of files 123) which have been recognized as malicious by the antivirus application 121 using the aforementioned antivirus record.

In yet another exemplary aspect, the effectiveness of the antivirus record can be calculated with the use of the following formula:

$$K=f*U$$

where K is the effectiveness of the antivirus record, U is the number of files (in one exemplary aspect, from the database of files 123) which have been recognized as malicious by the antivirus application 121 using the aforementioned antivirus record, and f is a coefficient which takes on the value 0 if there are trusted files among the files which have been recognized as malicious by the antivirus application 121 using the aforementioned antivirus record, and otherwise the value 1.

In yet another exemplary aspect, the effectiveness of the antivirus record can be calculated with the use of the following formula:

$$K=\Sigma_i^n a_i$$

where K is the effectiveness of the antivirus record, n is the total number of files which have been recognized as malicious using said antivirus record, and $a_i$ is a coefficient which can take on, for example, the following values (for the i-th file):
  the value "2" for malicious files;
  the value "−1000" for trusted files;
  the value "0.5" for untrusted files.

Information as to whether a file is malicious, trusted or untrusted, which is used in the above formula, can be obtained from the database of files 122 using the file identifier from the statistics on the use of antivirus record.

In yet another exemplary aspect, the database of files 122 in addition to each file can store its weighting factor p—popularity (number of users on whose computers such a file is found). In one exemplary aspect, this weighting factor for each file can be added to the database of files 122 by an expert in computer security. In this case, the effectiveness of the antivirus record can be calculated with the use of the following formula:

$$K=\Sigma_i^n a_i * p_i$$

where K is the effectiveness of the antivirus record, n is the total number of files which have been recognized as malicious with the use of said antivirus record, $p_i$—is the popularity of the i-th file, and $a_i$ is a coefficient which can take on the following values (for the i-th file):
  the value "1" for malicious files;
  the value "−100" for trusted files;
  the value "0" for untrusted files.

Information as to whether a file is malicious, trusted or untrusted, which is used in the above formula, and also the coefficient $p_i$ for each file, can be obtained from the database of files 122 by the file identifier from the statistics on the use of antivirus record.

In one exemplary aspect, the module for generating a set of antivirus records 126 is configured to generate a set of antivirus records for transmission of said set of antivirus records to the user's computer 100, specifically to the database of antivirus records 102. To generate the set of antivirus records, the module 126 may utilize antivirus records from the database of antivirus records 122, as well as the effectiveness of each aforementioned antivirus record, provided by the module 127 from the database of antivirus records 122. The purpose of generating a set of antivirus records is to generate a set of antivirus records so that all malicious files from the database of files 123 can be detected with the help of the antivirus application 121 utilizing the aforementioned set of antivirus records. This set of antivirus records consists of a minimum quantity of antivirus records, which reduces the amount of memory on the hard drive of the user's computer 100 occupied by the antivirus records stored in the database of antivirus records 102 and used by the antivirus application 101.

In one exemplary aspect, the module for generating a set of antivirus records 126 may generate a set of antivirus records as follows: for a malicious file from the database of files 123 an antivirus record is selected with the highest effectiveness from among those antivirus records in the database of antivirus records 122. Using these records the antivirus application 121 recognized said file as being malicious (in accordance with the statistics on the use of antivirus records previously collected by the antivirus application 121). The selected record is added to the set of antivirus records by the module for generating a set of antivirus records 126. For the next file from the database of files 123 in similar fashion an antivirus record is selected with the highest effectiveness from among those antivirus records of the database of antivirus records 122. Using these records the antivirus application 121 recognized the mentioned file as being malicious, while if the selected antivirus record is already present in the set of antivirus records being generated by the module 126, the antivirus record will not be added once more (to exclude duplication of antivirus records in the set). But if the selected antivirus record is not present in the set of antivirus records, the mentioned antivirus record is added by the module 126 to the set of antivirus records. The module for generating a set of antivirus records 126 performs the aforementioned actions for each malicious file from the database of files 123. The set of antivirus records generated in this way is sent by the module 126 to the user's computer 100, specifically to the database of antivirus records 102, for subsequent use of the antivirus records from the transmitted set of antivirus records by the antivirus program 101 for detection of malicious files on the user's computer 100.

Figure 2:
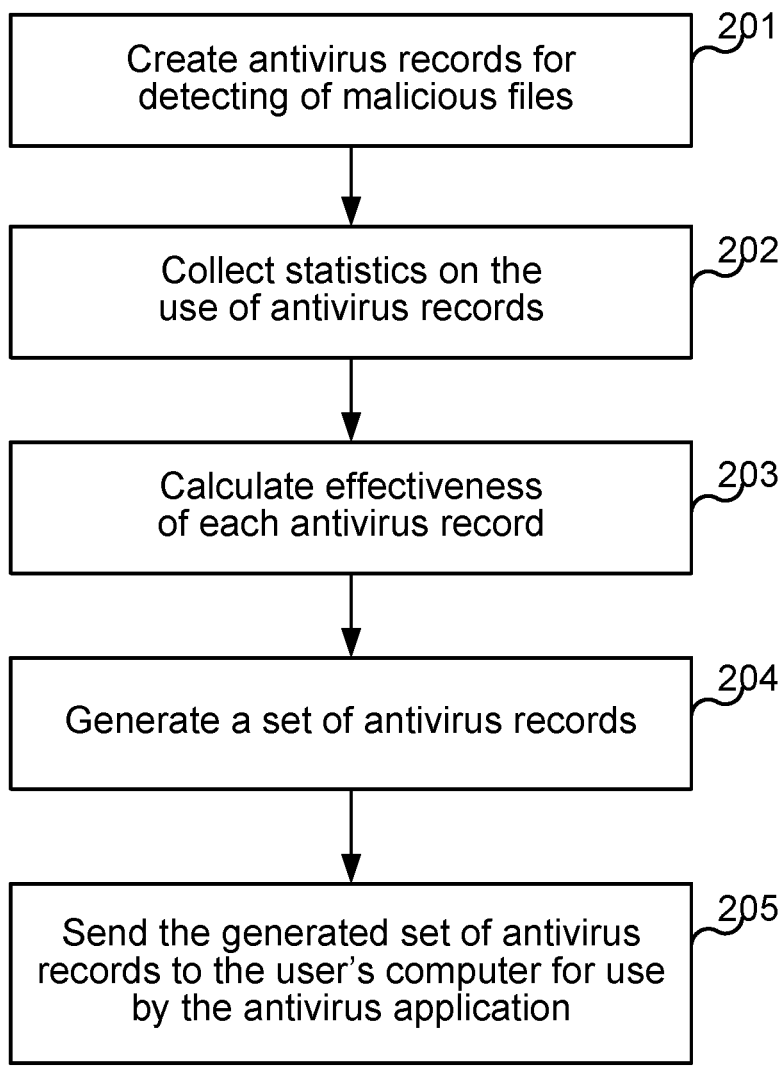
FIG. 2 shows a flow diagram of an exemplary method of generating a set of antivirus records to be used for detection of malicious files on a user device.

FIG. 2 shows an exemplary method of generating a set of antivirus records to be used for detection of malicious files on a user's computer according to one aspect of the invention. In step 201, the module of creating antivirus records 125 creates a set of antivirus records for each malicious file from the database of files 123, each of the antivirus records from the set may be created using one of the above-described methods of creating antivirus records. The created antivirus records are saved by the module 125 in the database of antivirus records 122. In step 202, the antivirus application 121 collects statistics on the use of the antivirus records from the database of antivirus records 122. The antivirus application 121 uses the antivirus records from the database of antivirus records 122 to detect malicious files among the files (all files, not only the malicious ones) from the database of files 123 (the detection of a malicious file by the antivirus application 121 meaning the recognition of the file as being malicious in accordance with the antivirus records used by the antivirus application 121). The collected statistics on the use of the antivirus records are saved by the antivirus application 121 in the database of statistics 124. Next, in step 203, the module for evaluating the effectiveness of antivirus records 127 calculates the effectiveness of each antivirus record from the database of antivirus records 122 on the basis of the statistics on the use of the antivirus records, which are contained in the database of statistics 124. The calculated effectiveness of each antivirus record is sent by the module 127 to the module of generating a set of antivirus records 126. In step 204, the module 126 generates a set of antivirus records, such that for each malicious file from the database of files 123, the antivirus record is selected with the highest effectiveness from among all the antivirus records. Using this record the antivirus application 121 recognized that file as being malicious. The selected antivirus records is added by the module for generating a set of antivirus records 126 to the aforementioned set of antivirus records (being generated). The information as to which files are recognized as malicious by the antivirus application 121 using the antivirus record, which information is needed by the module of generating a set of antivirus records 126 to generate the set of antivirus records, is stored in the database of statistics 124—the database of statistics saves for each antivirus record the identifiers of each file recognized as malicious by the antivirus application 121 with the use of said antivirus record. Using the identifier of each malicious file from the database of files 123, the module of generating a set of antivirus records 126 determines all the antivirus records from the database of antivirus records 122, using which the antivirus application 121 recognized this file as being malicious. The generated set of antivirus records in step 205 is sent by the module of generating a set of antivirus records 126 to the database of antivirus records 102 residing on the user's computer 100, for later use of the antivirus records from this set by the antivirus application 101 to detect malicious files on the user's computer 100.

Figure 3:
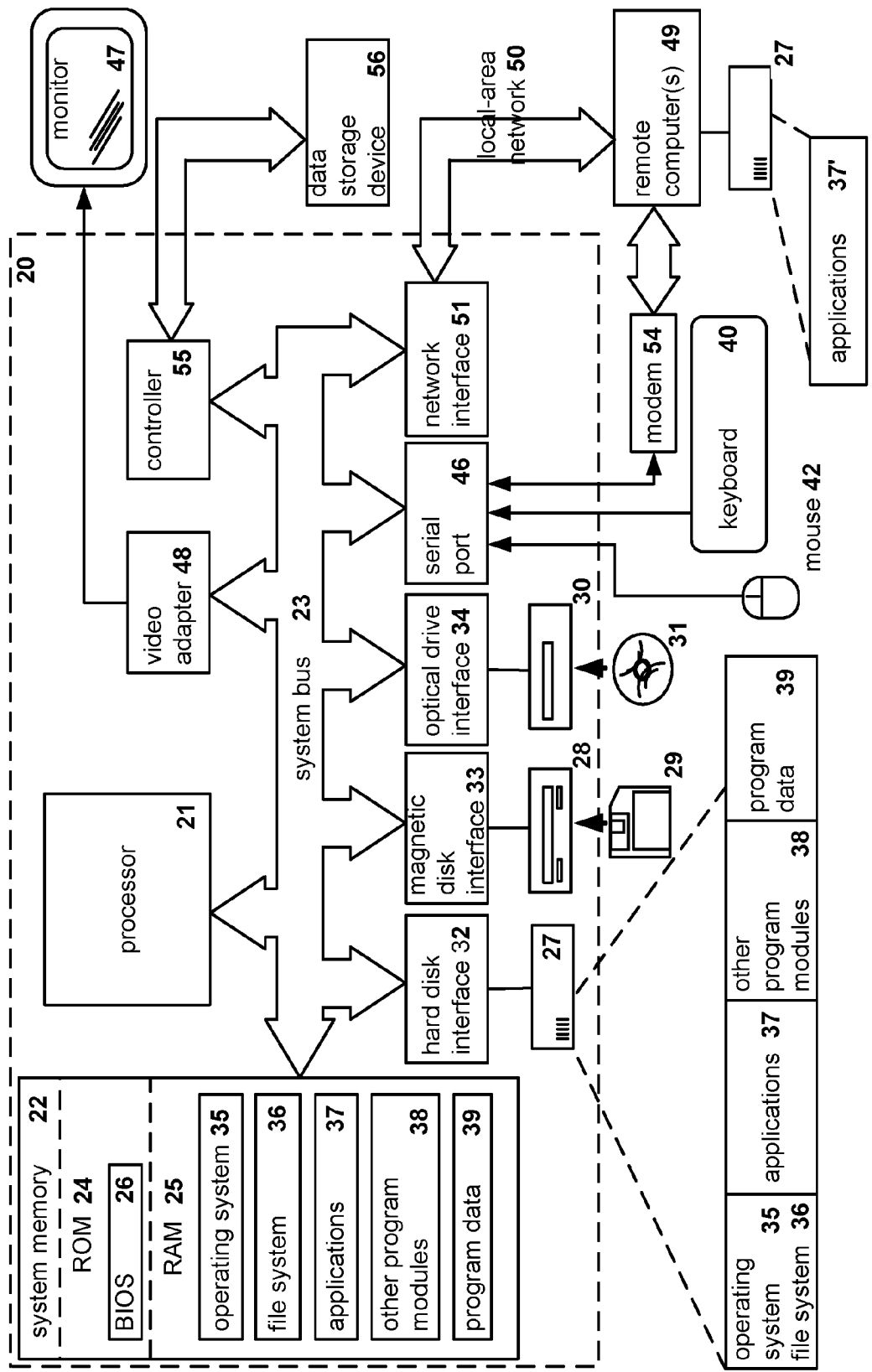
FIG. 3 illustrates an example of a general-purpose computer system by means of which the disclosed aspects of systems and method can be implemented.

FIG. 3 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are effectiveness-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for generating a set of antivirus records, the method comprising:
   maintaining, by a server, a database of malicious files;
   generating, by the server, at least one antivirus record for each malicious file in the database of malicious files;
   calculating, by the server, an effectiveness of each antivirus record by determining how many different malicious files were detected using each antivirus record and a number of false positive detections by said antivirus record;
   generating, by the server, a set of the most effective antivirus records, comprising:
      selecting for each known malicious file the most effective antivirus record used in detection of said malicious file, wherein the most effective antivirus record is calculated as a function of both the number of different malicious files detected by said antivirus record and the number of false positive detections by said antivirus record;
      determining whether the selected antivirus record is already in the set; and
      when the selected antivirus record is not in the set, adding said record to the set; and
   transmitting, by the server, the set of most effective antivirus records to a client device.

2. The method of claim 1, wherein the antivirus record includes one or more of: a signature of a malicious file; a heuristic rule used for detection of a malicious file during emulation of the malicious file; a heuristic rule used for detection of a malicious file during proactive detection; and a locality sensitive hash of a malicious file.

3. The method of claim 1, wherein calculating an effectiveness of each antivirus record includes collecting, by an antivirus application running on the server, statistics on a number of malicious files detected by the antivirus application using each antivirus record.

4. The method of claim 1, wherein the antivirus record for each malicious file contains a locality sensitive hash calculated from a set of file attributes of the malicious file.

5. The method of claim 1, wherein the antivirus record for each malicious file contains a plurality of locality sensitive hashes comprising at least two locality sensitive hashes calculated from different sets of file attributes of the malicious file.

6. The method of claim 1, wherein the effectiveness of an antivirus record is calculated as a function of a number of different malicious files detected by said antivirus record, the number of false positive detections by said antivirus record, and a category to which each of the detected malicious files belongs, the category including one of the trusted, untrusted and malicious.

7. The method of claim 6, wherein the effectiveness of an antivirus record is further calculated as a function of a popularity of each detected malicious file on client devices.

8. A system for generating sets of antivirus records, the system comprising:
   a server having a hardware processor configured to:
      maintain a database of malicious files;
      generate at least one antivirus record for each malicious file in the database of malicious files;
      calculate effectiveness of each antivirus record by determining how many different malicious files were detected using each antivirus record and a number of false positive detections by said antivirus record;
      generate a set of the most effective antivirus records, by:
         selecting for each known malicious file the most effective antivirus record used in detection of said malicious file, wherein the most effective antivirus record is calculated as a function of both the number of different malicious files detected by said antivirus record and the number of false positive detections by said antivirus record;
         determining whether the selected antivirus record is already in the set; and
         when the selected antivirus record is not in the set, adding said record to the set; and
      transmit the set of most effective antivirus records to a client device.

9. The system of claim 8, wherein the antivirus record includes one or more of: a signature of a malicious file; a heuristic rule used for detection of a malicious file during emulation of the malicious file; a heuristic rule used for detection of a malicious file during proactive detection; and a locality sensitive hash of a malicious file.

10. The system of claim 8, wherein calculating an effectiveness of each antivirus record includes collecting, by an antivirus application running on the server, statistics on a number of malicious files detected by the antivirus application using each antivirus record.

11. The system of claim 8, wherein the antivirus record for each malicious file contains a locality sensitive hash calculated from a set of file attributes of the malicious file.

12. The system of claim 8, wherein the antivirus record for each malicious file contains a plurality of locality sensitive hashes comprising at least two locality sensitive hashes calculated from different sets of file attributes of the malicious file.

13. The system of claim 8, wherein the effectiveness of an antivirus record is calculated as a function of a number of different malicious files detected by said antivirus record, the number of false positive detections by said antivirus record, and a category to which each of the detected malicious files belongs, the category including one of the trusted, untrusted and malicious.

14. The system of claim 13, wherein the effectiveness of an antivirus record is further calculated as a function of a popularity of each detected malicious file on client devices.

15. A non-transitory computer readable medium storing computer executable instructions for generating sets of antivirus records, including instructions for:
  maintaining, by a server, a database of malicious files;
  generating, by the server, at least one antivirus record for each malicious file in the database of malicious files;
  calculating, by the server, an effectiveness of each antivirus record by determining how many different malicious files were detected using each antivirus record and a number of false positive detections by said antivirus record;
  generating, by the server, a set of the most effective antivirus records, comprising:
    selecting for each known malicious file the most effective antivirus record used in detection of said malicious file, wherein the most effective antivirus record is calculated as a function of both the number of different malicious files detected by said antivirus record and the number of false positive detections by said antivirus record;
    determining whether the selected antivirus record is already in the set; and
    when the selected antivirus record is not in the set, adding said record to the set; and
  transmitting, by the server, the set of most effective antivirus records to a client device.

16. The non-transitory computer readable medium of claim 15, wherein the antivirus record includes one or more of: a signature of a malicious file; a heuristic rule used for detection of a malicious file during emulation of the malicious file; a heuristic rule used for detection of a malicious file during proactive detection; and a locality sensitive hash of a malicious file.

17. The non-transitory computer readable medium of claim 15, wherein calculating an effectiveness of each antivirus record includes collecting, by an antivirus application running on the server, statistics on a number of malicious files detected by the antivirus application using each antivirus record.

18. The non-transitory computer readable medium of claim 15, wherein the antivirus record for each malicious file contains a locality sensitive hash calculated from a set of file attributes of the malicious file.

19. The non-transitory computer readable medium of claim 15, wherein the antivirus record for each malicious file contains a plurality of locality sensitive hashes comprising at least two locality sensitive hashes calculated from different sets of file attributes of the malicious file.

20. The non-transitory computer readable medium of claim 15, wherein the effectiveness of an antivirus record is calculated as a function of a number of different malicious files detected by said antivirus record, the number of false positive detections by said antivirus record, and a category to which each of the detected malicious files belongs, the category including one of the trusted, untrusted and malicious.

21. The non-transitory computer readable medium of claim 20, wherein the effectiveness of an antivirus record is further calculated as a function of a popularity of each detected malicious file on client devices.

* * * * *